(No Model.) 3 Sheets—Sheet 1.
C. FELLNER.
REVOLVING ROASTING FURNACE.
No. 491,704. Patented Feb. 14, 1893.
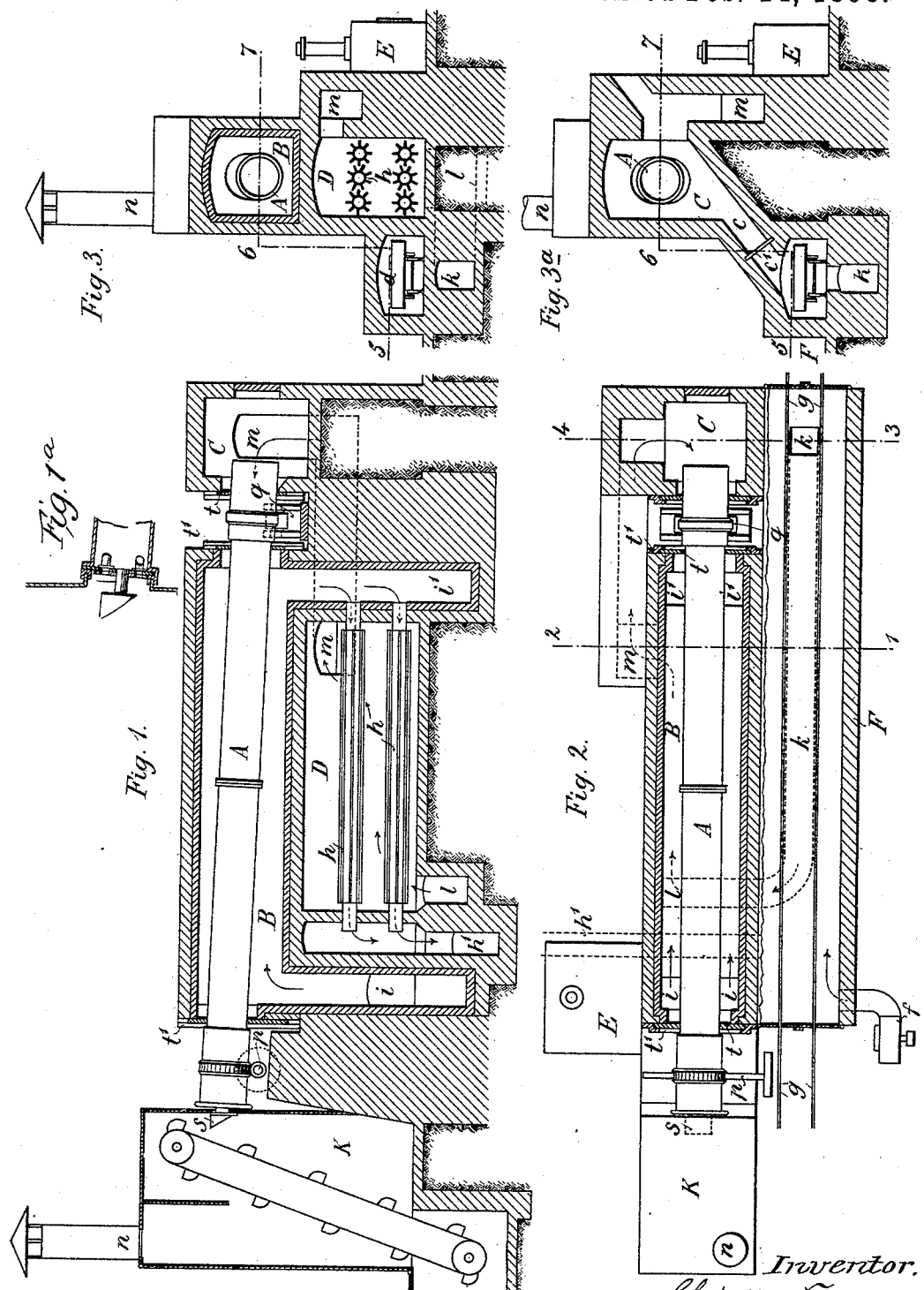

(No Model.) 3 Sheets—Sheet 2.
C. FELLNER.
REVOLVING ROASTING FURNACE.
No. 491,704. Patented Feb. 14, 1893.
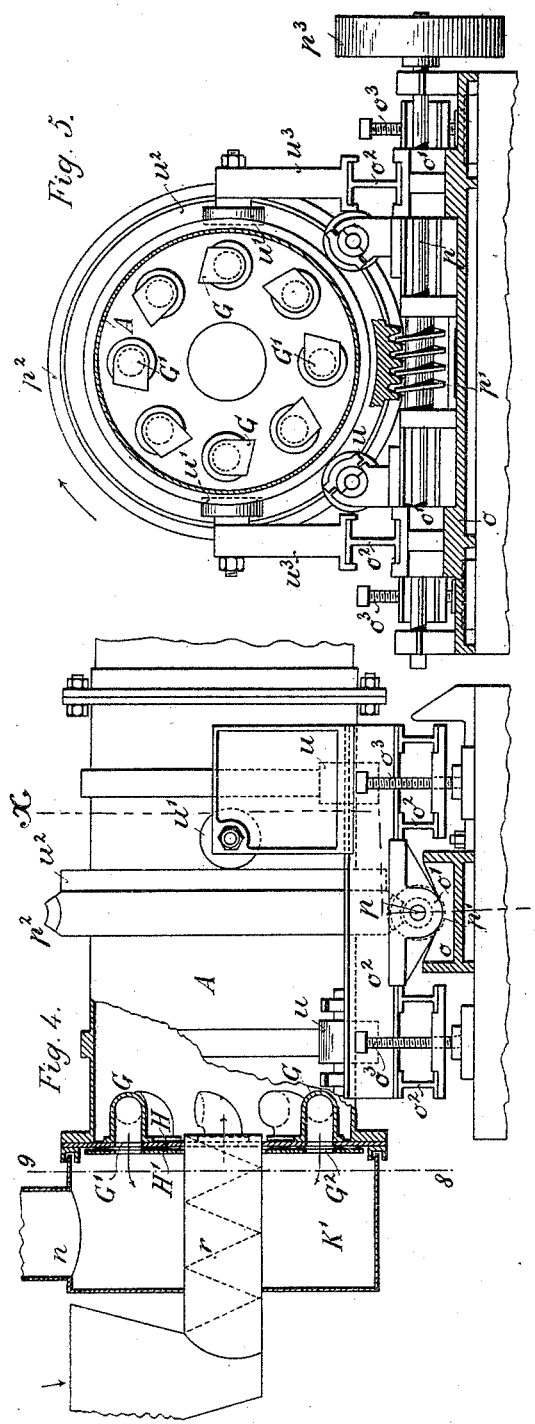
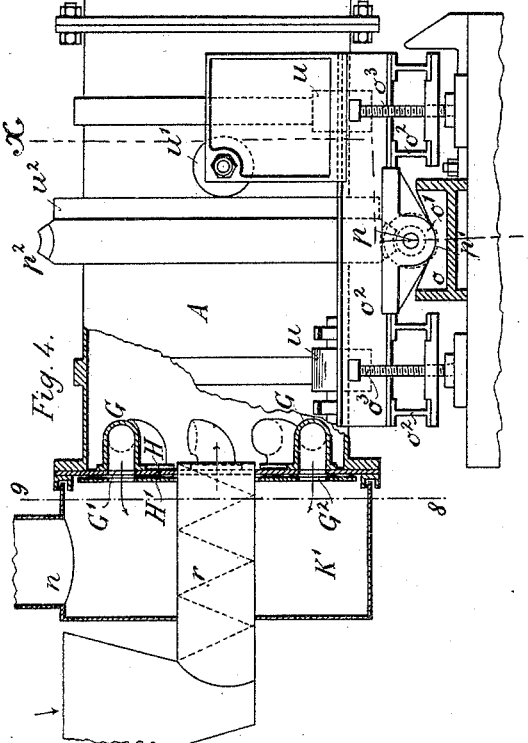
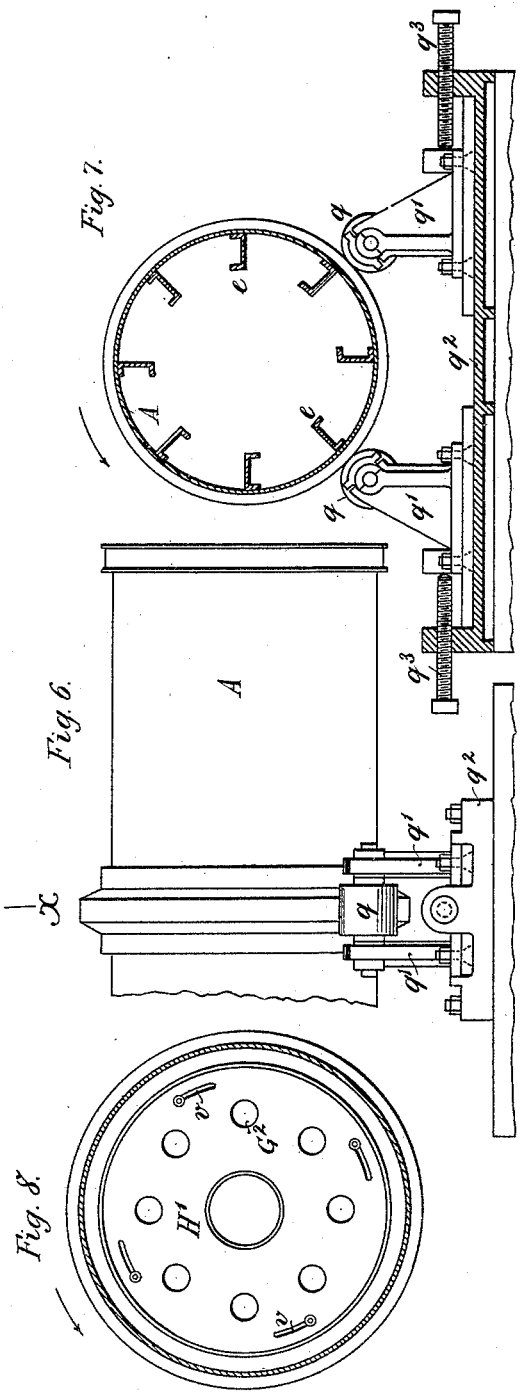

(No Model.) 3 Sheets—Sheet 3.

C. FELLNER.
REVOLVING ROASTING FURNACE.

No. 491,704. Patented Feb. 14, 1893.

Witnesses:
E. F. Bolton
D. T. Jones

Inventor:
Christian Fellner
By Richards
his Attorneys.

UNITED STATES PATENT OFFICE.

CHRISTIAN FELLNER, OF BOCKENHEIM, GERMANY.

REVOLVING ROASTING-FURNACE.

SPECIFICATION forming part of Letters Patent No. 491,704, dated February 14, 1893.

Application filed May 12, 1892. Serial No. 432,762. (No model.)

*To all whom it may concern:*

Be it known that I, CHRISTIAN FELLNER, a subject of the King of Prussia, residing at Bockenheim, Kingdom of Prussia, have invented new and useful Improvements in Revolving Roasting-Furnaces, whereof the following is a specification.

My invention relates to the drying, burning and roasting of materials by means of inclined rotative drums provided with appliances for heating them from the outside and for introducing into the same an aeriform fluid either in cold or in heated state.

The improvements consist in the particular combination, with the drum of a heating-chamber and an accessory chamber, in the construction of the mechanism for rotating the drum and altering its angle of inclination, in means for producing tight joints between the drums and the walls of the said chambers, for causing the material in the drum to be raised and allowed to drop again at intervals and at different periods for different portions of the same, and for insuring a regular eduction from the drum of the aeriform fluid introduced and controlling this eduction.

In the annexed drawings is represented an apparatus constructed according to my invention.

Figure 11:
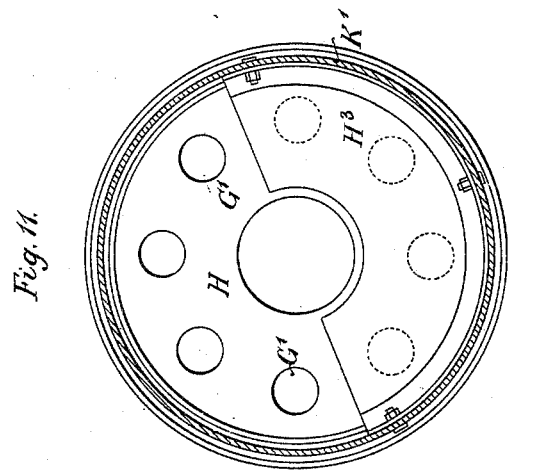
Figure 13:
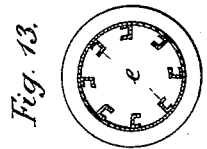
Figure 9:
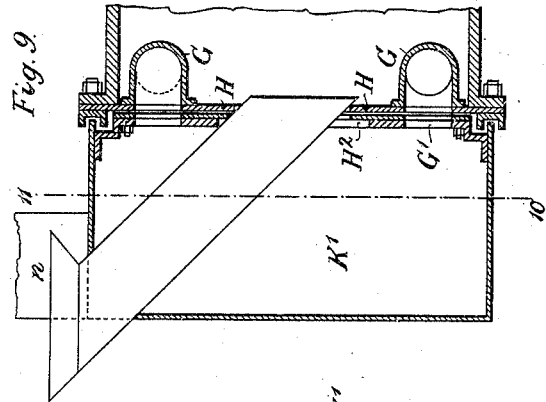
Figures 12, 14:
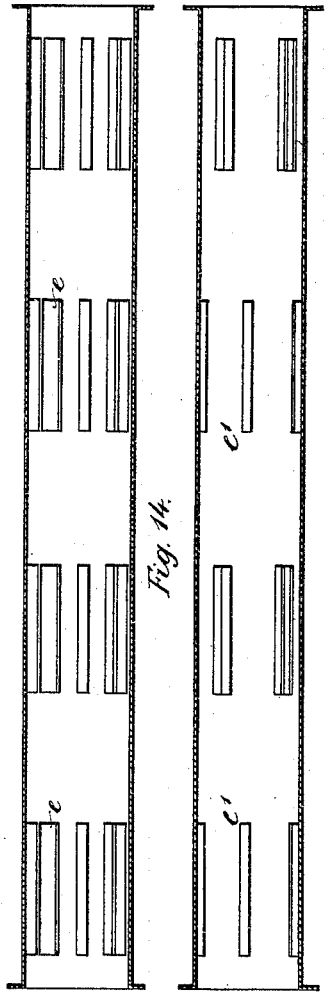
Figure 10:
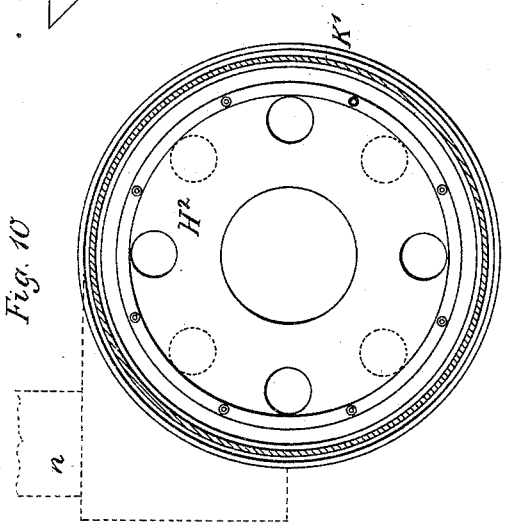

Figure 1 is a longitudinal section of the same along the center-line of the drum. Fig. 1ª is a detail sectional view of the upper end of the drum of Fig. 1. Fig. 2 is a sectional plan on the broken line 5, 6, 7, Figs. 3 and 3ª which are transverse sections on the respective lines 1, 2 and 3, 4, Fig. 2. Fig. 4 is a sectional side elevation of the upper end of the drum together with the mechanism for rotating the same and for allowing its angle of inclination to be altered. In this view the hopper and means for feeding the ore to the drum is slightly different from that of Fig. 1. Fig. 5 is a transverse sectional view looking into the drum the section being on line $x$—$x$ of Fig. 4, some of the parts being shown in elevation. Fig. 6 is a side view of the lower drum-end, and Fig. 7 a transverse sectional view corresponding thereto, these two figures, showing the mechanism for altering the angle of inclination of the drum. Fig. 8 is a sectional view on line 8, 9, Fig. 4, looking toward the head of the drum. Fig. 9 is a longitudinal section through the upper drum-head and chamber annexed thereto, and Fig. 10 a section on line 10, 11 showing certain modifications. Fig. 11 is a view alike to Fig. 10 showing another modification. Figs. 12 and 13 are a longitudinal and transverse sections of the drum, illustrating the arrangement of ledges inside of the same. Fig 14 is a view similar to Fig. 12, representing a modification of this arrangement.

Referring to Figs. 1 to 7, A is the drum mounted near its ends on rollers and provided with means for rotating the same and for altering its angle of inclination. The middle portion of this drum lies in a heating-chamber B, Figs. 1, 2, 3, communicating at one end by means of channel $i$ with the furnace E.

Under the heating-chamber is arranged an air-heating stove consisting in a chamber D through which pass the ribbed iron pipes $h$, communicating at their respective ends with the channels $i'$ and $h'$, the former being connected to the heating-chamber B at the end opposite to the one mentioned above, while the latter, i. e. channel $h'$, leads to a chimney, not shown in the drawings. The products of combustion emerging from the furnace E, pass through channel $i$ into chamber B where they heat the drum A, and then take their course through channel $i'$, tubes $h$, and channel $h'$ to the chimney.

The air or gas to be heated in the stove is introduced into chamber D through channel $l$. Previous to its entrance into the said channel it is, however, by preference, caused to pass through an annex F adapted for the location of trucks $d$, Figs. 3 and 3ª, serving for the reception and conveyance of the material treated in the drum. The said annex is provided with a line of rails for the trucks to run on, and it is fitted at both ends with doors. In this annex the air or gas forced into the same by any suitable means, such as fan $f$, Fig. 2, is warmed by the material contained in the trucks, while on the other hand the material is cooled. From the annex the air or gas passes through channel K to channel $l$ and thence into chamber D, where it is heated by means of tubes $h$. From chamber D it flows through channel $m$ to a chamber C, into which extends the lower end of the drum A, so that it has to take its course through the drum into chamber K, whence it issues by the funnel $n$.

The material to be roasted, burned or dried, is fed into the drum at $s$ by any suitable contrivance, such as the elevator $a$, Fig. 1, arranged in chamber K, or the conveyer $r$ Fig. 4. The material issuing from the drum, is received in chamber C, whence it slides through an inclined duct $c$ into the trucks $d$. The said duct is provided with a slide $c'$ whereby it is ordinarily kept closed, if the air or gas is to pass through the heating-stove, the duct being opened only at intervals to allow the material to issue. If, however, the air or gas is to flow in unheated state into the drum, the duct is left permanently open for its passage.

At its upper end, projecting from the heating chamber, the drum is supported on four rollers $u$, Figs. 4 and 5, and with these is combined the mechanism for rotating the drum and for allowing its angle of inclination to be altered, while the rollers $q$, Figs. 6 and 7, carrying the drum at its lower end, and the mechanism for producing the alteration of the said angle, are located in the space left between the heating-chamber D and chamber C. The said parts are thus arranged to be kept as cool as possible and to be under free control. The rollers $u$ are mounted with their axles in bearings fixed to a frame $o^2$ having hollow trunnions $o'$, which rest in the open bearings $o$. The drum may thus be oscillated together with frame $o^2$ and rollers $u$ on the said trunnions.

In view of preventing the inclined drum from sliding lengthwise, it is provided with a collar $u^2$, against which bear the rollers $u'$ pivoted to standards forming a part of frame $o^2$.

The means for rotating the drum consist in the worm-wheel $p^2$ fixed thereto and the worm $p'$ having the shaft $p$, which passes through the hollow trunnions $o'$ so as to be co-axial therewith, the position of the worm relatively to the worm-wheel remaining, in consequence, unvaried by an alteration of the incline of the drum. On one end of the shaft $p$ is keyed the driving-pulley $p^3$. The frame $o^2$ may be secured in its position by the screws $o^3$.

The rollers $q$ carrying the drum at its lower end, rotate in bearings $q'$ placed with their sole-plates on guiding-ways formed on the bed-plate $q^2$ transversely to the drum, so that the bearings may be shifted thereon by means of the screws $q^3$ working in lugs on bed-plate $q^2$. If, under these conditions, the screws $q^3$ are screwed farther in, the rollers are brought nearer to each other with the effect of raising the drum at its lower end, while it turns on the trunnions $o'$, the angle of inclination of the drum being thereby diminished. If, on the other hand, the screws $q^3$ are turned backward, the drum will by its weight press the rollers and the bearings farther apart and thus cause its angle of inclination to become greater. Previous to such adjustment of the drum the screws $o^3$ must of course be slackened. According as the drum is inclined more or less, the speed with which the material advances during the rotation of the drum will be greater or lower.

For allowing the inclination of the drum to be altered, the apertures in the walls of chambers B and C through which the drum passes, require to be made oblong in vertical direction. Now, for closing the spaces between the periphery of these apertures and the drum, plates $t$ are provided for, which closely encircle the drum and bear against the walls of the chambers B and C, the said plates being movable in guides $t'$.

In order to insure a regular eduction, from the drum, of the aeriform fluid introduced at its lower end, the same is provided at the upper end with a head-plate H having round about its central feeding-aperture a number of apertures $G'$, Figs. 4 and 5, and carrying on the inside elbow-tubes G communicating with the apertures $G'$, the said elbow-tubes being bent contrary to the direction of rotation of the drum, so that, when the drum rotates, the material fed into the latter will be pushed aside by the back of the elbow-tubes, and the apertures through which the aeriform fluid is to pass out, will consequently remain unobstructed. The ends of the elbow-tubes may be square to their center-line, but preferably they are cut off obliquely, as shown in Fig. 5, in view of more effectually preventing any material from dropping into the same.

On the outside the head-plate H is provided with an adjustable register-plate $H'$, Figs. 4 and 8, having holes $G^2$ corresponding to the apertures $G'$, the plate $H'$ being adapted to be turned for the purpose of reducing the free area of the apertures $G'$ and diminishing the quantity of aeriform fluid passing through the drum. The said register-plate may be guided to move in a circle by means of curved slits $v$ cut into the plate, and screw-studs screwed into head-plate H and passing through the slits $v$, as shown by Figs. 4 and 8. By means of nuts on the studs the register plate is secured in the desired position. The aeriform fluid issuing from the drum passes into the chamber K, Fig. 1, or $K'$, Fig. 4, from which it is conducted into the open air by the funnel $n$.

Figs. 9 and 10 show a modification of the arrangement of the register-plate. The said plate, $H^2$, is in this case fixed to the chamber $K'$, and it is provided with a smaller number of holes than there are apertures in the head-plate H, so that the latter are, during the rotation of the drum, opened and closed alternately, the aeriform fluid being under these conditions allowed to issue from the drum at intervals only. According to Fig. 11 the register-plate $H^3$, which is also fixed to chamber K, is made semicircular and not provided with holes, so that the air or gas can issue from the drum but on one side.

In view of causing all portions of the material under treatment in the drum to be exposed uniformly to the action of the air, gas or vapor introduced, it requires to be thoroughly stirred during its passage downward. For similar purposes ledges fastened to the periphery of the drum and extending lengthwise from one end of the same to the other, have heretofore already been employed; but with ledges of this description the material is not left sufficiently exposed to the heated walls of the drum.

In order to combine in a better manner the operations of heating and exposure to the action of the gas, &c., I fix to the drum peripheral rows of longitudinal ledges, $e$ Figs. 12 and 13, the length whereof is but a fraction of that of the drum and which leave spaces between their ends, so that the material is stirred by being raised and allowed to drop again periodically, while in the intervals it rests on the heated surface of the drum. For some purposes it is advantageous to shift the ledges of each peripheral row relatively to the neighboring peripheral rows, $i.\ e.$ to place each ledge of one row lengthwise opposite to a space between those of the peripheral rows next to the former as shown by Fig. 14. In this case different portions of material are raised and allowed to drop again in succession. The said ledges are preferably made of bars of iron having in section U-shape.

I claim as my invention.

1. The combination of an inclined rotative drum open at the lower end and having feeding and air-eduction apertures at the upper end, a heating chamber surrounding the middle portion of said drum, chamber C communicating with the lower end of the drum and separated by an intervening space from the heating-chamber, rollers for supporting the drum placed near its upper end and in the said space, mechanism for rotating the drum and means for introducing into the chamber C an aeriform fluid, substantially as described.

2. The combination of an inclined rotative drum open at the lower end and having feeding and air-eduction apertures at the upper end, a heating chamber surrounding the middle portion of said drum, chamber C communicating with the lower end of the drum and separated by an intervening space from the heating-chamber, rollers for supporting the drum placed near its upper end and in the said space, mechanism for rotating the drum, an air-heating stove connected to chamber C, and means for passing an aeriform fluid through the said stove, substantially as specified.

3. The combination of an inclined rotative drum open at the lower end and having feeding and air-eduction apertures at the upper end, a heating chamber surrounding the middle portion of said drum, chamber C communicating with the lower end of the drum and separated by an intervening space from the heating-chamber, rollers for supporting and mechanism for rotating the drum and for altering its angle of inclination, placed partly near its upper end and partly in the said space, and means for introducing into the chamber C an aeriform fluid, substantially as set forth.

4. The combination of an inclined rotative drum A, having near one end a collar $u^2$, a frame $o^2$ having trunnions $o'$ with axial perforations, bearings $o$ in which said trunnions rest, rollers $u$ mounted in frame $o^2$ and adapted to carry the drum, rollers $u'$ also mounted in frame $o^2$ and bearing from the side against collar $u^2$, worm-wheel $p^2$ secured on the drum, worm $p'$ gearing with the worm-wheel and having a shaft $p$ passing through the perforations of trunnions $o'$, means for rotating the said shaft and worm, two rollers $q$ placed under the drum near its other end, sliding bearings for rollers $q$, and means for shifting the said sliding bearings closer together and farther apart, substantially as set forth.

5. The combination of an inclined rotative drum A open at the lower end and having apertures at the upper end, mechanism for rotating the same and for altering its angle of inclination, heating-chamber B surrounding the middle portion of said drum, chamber C communicating with the lower end of the drum and separated from the heating chamber by an intervening space, the walls of the said chambers B and C having apertures for the drum to pass through that are larger than the latter, and sliding plates $t$ encircling the drum and bearing against the walls of the chambers B and C, substantially as specified.

6. The combination of an inclined rotative drum open at the lower end, mechanism for rotating the same, means for introducing into the lower end of the drum an aeriform fluid, the said drum having at its upper end a head-plate H provided with a central feeding-aperture, and with eduction-apertures G' surrounding the feeding-aperture and carrying inside elbow-tubes G communicating with the apertures G', the said elbow-tubes being bent contrary to the direction of rotation of the drum, substantially as specified.

7. The combination of an inclined rotative drum open at the lower end, mechanism for rotating the same, means for introducing into the lower end of the drum an aeriform fluid, the said drum having at its upper end a head-plate H provided with a central feeding-aperture and with eduction-apertures G' surrounding the feeding-aperture and carrying inside elbow-tubes G communicating with the apertures G', the said elbow-tubes being bent contrary to the direction of rotation of the drum, and a register plate applied to the head-plate H and adapted to close all or any of the apertures G', substantially as described.

8. In combination the inclined drum, the means for rotating it, the means for feeding the material thereto, said drum having ledges therein, said ledges being arranged in groups or series with spaces between said series the length of the ledges, being only a fraction of that of the drum, substantially as described.

In testimony whereof I have hereunto set my hand in the presence of two subscribing witnesses.

CHRISTIAN FELLNER.

Witnesses:
JEAN GRUND,
FRANK H. MASON.